United States Patent [19]

Hunter et al.

[11] 3,975,961

[45] Aug. 24, 1976

[54] FLUIDIC TRANSVERSE-IMPACT MODULATOR ACCELEROMETER

[75] Inventors: Joe S. Hunter, Huntsville; Escar L. Bailey, Athens; Little J. Little, Huntsville, all of Ala.

[73] Assignee: The United States of America as represented by the Secretary of the Army, Washington, D.C.

[22] Filed: Nov. 28, 1975

[21] Appl. No.: 636,194

[52] U.S. Cl................................ 73/515; 137/824
[51] Int. Cl.².......................................... G01P 15/02
[58] Field of Search........... 73/515, 516 R; 137/804, 137/824, 827, 829

[56] References Cited
UNITED STATES PATENTS

| | | | |
|---|---|---|---|
| 3,513,710 | 5/1970 | Bates et al. ..................... | 73/515 X |
| 3,572,132 | 3/1971 | Trugman........................... | 73/515 |
| 3,771,369 | 11/1973 | Hunter et al...................... | 73/515 |

*Primary Examiner*—James J. Gill
*Attorney, Agent, or Firm*—Nathan Edelberg; Robert P. Gibson; Charles R. Carter

[57] ABSTRACT

A fluidic accelerometer employing a transverse-impact modulator for measuring acceleration or velocity of a body along a specified axis of the accelerometer. This device uses two similar collinear power-input tubes directed toward each other. The axially opposing power jets from the tubes impact where the flow meets an air-bearing supported proofmass containing annular rings and produce symmetrical radial flow cones at the balance point. A change in the position of the proofmass causes the balance point to move which causes the radial flow cones to become asymmetrical and a net pressure difference is developed in the output receivers.

7 Claims, 2 Drawing Figures

FLUIDIC TRANSVERSE-IMPACT MODULATOR ACCELEROMETER

DEDICATORY CLAUSE

The invention described herein may be manufactured, used, and licensed by or for the Government for governmental purposes without the payment to us of any royalties thereon.

BACKGROUND OF THE INVENTION

This invention relates to the field of fluidic accelerometers. Fluidic and flueric components have been of interest, particularly in the missile field, because of their inherent reliability due to the simplicity, ruggedness and lack of sensitivity to environmental conditions such as radiation, temperature, shock and vibration. There are numerous types of fluidic as well as flueric components that are used in various types of control systems, including control systems for missiles. One such flueric accelerometer is shown and discussed in U.S. Pat. No. 3,771,369 assigned to the U.S. Government. However such flueric systems can produce undesirable high frequency responses in an otherwise low frequency response requirement.

SUMMARY OF THE INVENTION

It is an object of this invention to provide a high density proofmass operating in conjunction with a low density fluid to achieve an accelerometer that will perform efficiently in low and medium level g environments. That is the accelerometer will be particularly useful in a system having low and medium frequency response requirements and thereby filter out undesirable high frequencies.

Another object of the invention is to provide a single axis accelerometer with only one moving part (proofmass) that produces an output proportional to the specific force input over the linear range of operation.

The apparatus of the present invention is a device for measuring the rate of change of velocity along an axis and producing an output differential pressure proportional thereto.

This device has two similar collinear power input tubes directed toward each other. The axially opposing power jets from the tubes impact where the flow meets an air-bearing supported proofmass containing an annular ring on each side and produce symmetrical radial flow cones at the balance point. Equal amounts of the power jet streams are deflected into each of the output receivers when the proofmass is in its reference position, resulting in a differential pressure output of zero between the two output receivers. A change in the position of the proofmass causes the balance point to move. As the balance point moves, the radial flow cones become asymmetrical and a net pressure difference is developed in the two output receivers.

A control signal is applied perpendicular to one of the collinear power jet streams. This power jet stream is deflected by momentum exchange with the control jet, and the balance point and proofmass move upstream toward the nozzle of the deflected jet. As the balance point moves away from the output receiver, pressure and flow of the transverse power jet stream decrease. The pressure difference between the two output receivers is proportional to the applied acceleration along the sensitive axis.

This invention may be better understood from the following detailed description taken in conjunction with the accompanying drawings.

DETAILED DESCRIPTION OF THE INVENTION

Figure 1:
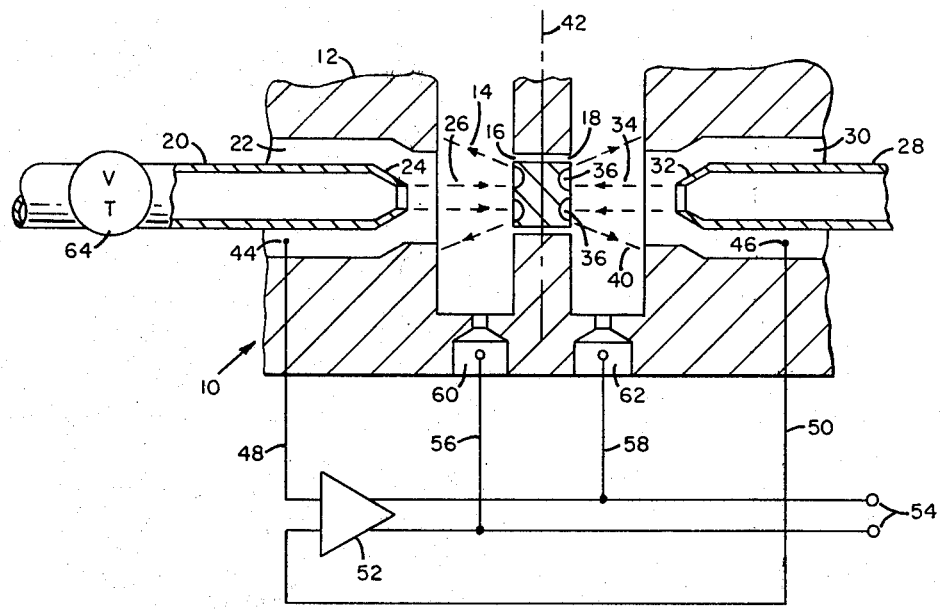
FIG. 1 is a sectional view of the fluidic transverse-impact modulator accelerometer and includes the required feedback control elements.

Accelerometer 10 shown in FIG. 1 includes a housing 12 having a fluid impact chamber 14 that can be mounted on a missile or other movable object on which acceleration information is to be taken. The fluidic TIM accelerometer 10 contains only one moving part that is a proofmass 16 which is supported by an air-bearing film 18 from a supply (not shown). A power input tube 20 is mounted in a receiver chamber 22 located in housing 12 by means (not shown) and connected to a suitable source of air under pressure (not shown). Tube 20 includes a converging nozzle section 24 on one end thereof that injects an air jet 26 into chamber 14.

A second power input tube 28 is mounted in a second receiving chamber 30 also located in housing 12. The tube 28 includes a converging nozzle section 32 that injects an air jet 34 in chamber 14. The axially opposing power jet streams 26 and 34 impact against opposite sides of the proofmass 16 around annular rings 36 and produces symmetrical radial flow cones 38 and 40 at the balance point 42. The two power input tubes are arranged in opposing relation to each other and the longitudinal axes thereof are collinear. Both power jet tubes are operated from a common source of air. Reflected streams from cones 38 and 40 will be collected in each of the receiver chambers 22 and 30. Pressure transducers 44 and 46 are placed respectively in the receiver chambers and are connected by leads 48 and 50 to a flueric operational amplifier 52. The amplifier output 54 has feedback signals 56 and 58 connected thereto for directing a feedback to the appropriate transverse control duct 60 or 62.

In operation when under static conditions (no acceleration), power from jet streams 26 and 34 exit from jet tubes 20 and 28. If the momentum of the power jets are the same, equal amounts of the reflected streams will be collected in each of the output receivers 22 and 30. With no acceleration applied to housing 12, the pressures sensed on the output pressure transducers 44 and 46 are, essentially equal. These pressures are directed to leads 48 and 50 of flueric operational amplifier 52. The amplifier differential output 54 is a differential pressure which is proportional to the acceleration applied to housing 12. Feedback signals 56 and 58 serve to maintain the accelerometer in a force balance state by directing a feedback to the appropriate transverse conduct duct 60 or 62. A non-zero output on differential output 54, which exists when housing 12 is not being accelerated is called bias. Any such bias may be reduced to zero by bias adjustment valve 64.

Figure 2:
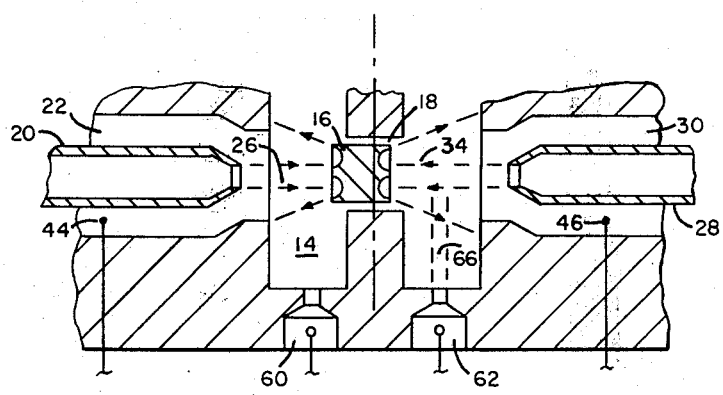
FIG. 2 illustrates the power jet steam orientation of the fluidic TIM accelerometer as it is being accelerated from left to right.

As the device is accelerated from left to right, the momentum of the right stream 34 is increased while that of the left stream 26 is decreased. This coupled with the inertia of the proofmass 16 contributes to a shifting of the balance point to the left of impact plane 42, more clearly shown in FIG. 2. The effect that the power jet streams 26 and 34 have on the shift is almost insignificant in comparison with the effect that the proofmass has on the shift. This condition increases the signal in output receiver 22 and decreases the signal in output receiver 30. These signals are detected by the output pressure transducers 44 and 46 and subsequently summed in the operational amplifier 52. After amplification by flueric operational amplifier, feedback signal 58 is applied to transverse control duct 62. Power jet stream 34 is deflected by momentum exchange with transverse control jet 66 and the balance point moves upstream toward the nozzle of the deflected jet 34. As the balance point cotinues to move away from output receiver 22, pressure and flow of the transverse power jet stream 66 decreases.

System gain is high enough to maintain the balance point near the impact plane 42, allowing only a small error signal as an input to the operational amplifier 52. The differential output 54 is proportional to acceleration.

The fluidic TIM accelerometer produces a differential pressure which is proportional to rate of change of velocity. The accelerometer can be fixed to a missile body or other body to provide velocity information thereof in a specific direction. If it is desired to measure acceleration along a lateral plane, the accelerometer can be mounted on a stabilized platform. By stabilizing such a platform with three gyros effective along the yaw, roll, and pitch axes, its direction in space can be controlled. With this typical arrangement, it is possible to utilize the accelerometer along longitudinal and lateral axes to determine either velocity by a single integration or distance traveled by two successive integrations. The accelerometer can also be used to provide data for cutting off a rocket motor at the desired point in a flight trajectory.

The high density proofmass operating in conjunction with a low density fluid makes the fluidic TIM accelerometer applicable for use in low and medium g missile guidance systems. The fluidic design also allows the accelerometer to operate in a high radiation environment without any compromise in performance. The only moving part of the system (proofmass) is suspended by an air-bearing, resulting in, essentially, zero wear on the accelerometer and increasing reliability substantially. The squeeze film effect inherent in an air-bearing causes the accelerometer to be virtually immune to damage from shock and vibration environments.

We claim:

1. A fluidic accelerometer for measuring acceleration along an axis of the accelerometer comprising: a housing that defines a fluid impact chamber; a pair of power jet tubes for directing two power jet fluid streams into said chamber, said power jet tubes being mounted in said housing in an opposing position so that the longitudinal axes of the tubes coincide and the power jet tubes discharge toward one another; a proofmass disposed in said chamber at a point where the axially opposing power jet streams impact the proofmass, said proofmass having surfaces contoured so that the streams are reflected from the proofmass in the form of radial cones; detector means for detecting the position of said radial flow cones in said fluid impact chamber and providing signals that are indicative of the positions of said radial cones and control means that receives signals from said detector means and develops a control signal for modulating the power jet fluid streams so as to maintain the proofmass centered to produce symmetrical radial flow cones; said control means including a first control duct and a second control duct formed in said housing providing control flows that are applied transversely to the power input jets.

2. A fluid accelerometer as set forth in claim 1 wherein said proofmass is supported by an air-bearing film.

3. A fluidic accelerometer as set forth in claim 2 wherein said detector means includes two receiver chambers formed in said housing that are in fluid communication with said fluid impact chamber, said two receiving chambers being positioned so that a receiving chamber is arranged around each power jet tube whereby movement of the radial flow cones in the fluid impact chamber will cause a pressure differential between the two receiving chambers.

4. A fluidic accelerometer as set forth in claim 3 including means for transmitting fluid signals indicative of fluid conditions in said receiving chambers from said receiving chamber to said control means.

5. A fluidic accelerometer as set forth in claim 4 wherein said transmitting means are pressure transducers.

6. A fluidic accelerometer as set forth in claim 5 wherein said control means includes a fluidic amplifier means that receives as inputs the signals from the receiving chambers and delivers an output signal in response thereto in the form of two control fluid flows, said first control duct receiving one of the two control fluid flows and discharges a flow into said fluid impact chamber, said first control duct being positioned so that the flow therefrom will impinge on one of said power jet streams at a point ahead of the proofmass impact point of the two power jets, said second control duct receiving the other of the two control fluid flows and discharges into said fluid impact chamber, said second control duct being positioned so that flow therefrom will impinge on the other of said power jets at a point ahead of the proofmass impact point of the two power jets, whereby the momentum of said power jets can be selectively altered to balance the proofmass impact point of the power jet fluid stream and maintain the radial flow cones in the fluid impact chamber.

7. A fluidic accelerometer as set forth in claim 6 including conduit means connected between said fluid amplifier and the control ducts for applying one of the two control fluid flows to said first control duct and the other control fluid flow to said second control duct.

* * * * *